Nov. 18, 1958  F. SCHERBAUM  2,861,227
HIGH-VOLTAGE DRY RECTIFIER
Filed June 6, 1956  4 Sheets-Sheet 1

Inventor:
Friedrich Scherbaum

Nov. 18, 1958  F. SCHERBAUM  2,861,227
HIGH-VOLTAGE DRY RECTIFIER
Filed June 6, 1956  4 Sheets-Sheet 2

Inventor:
Friedrich Scherbaum

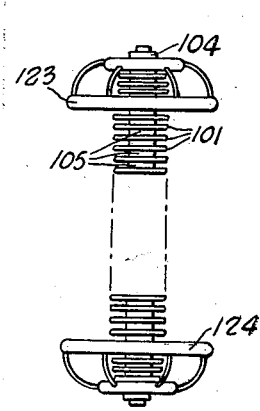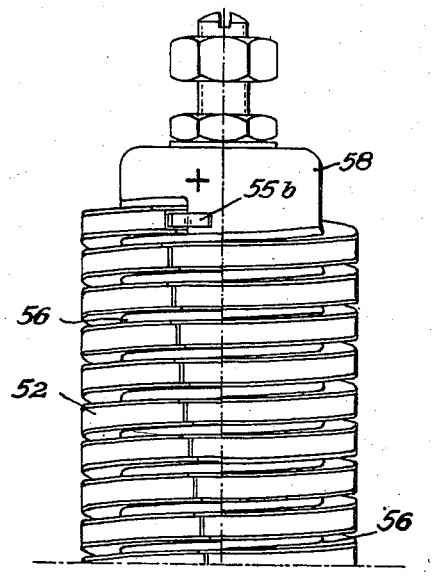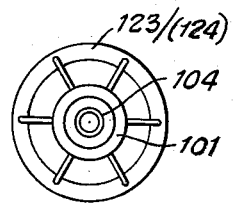

Nov. 18, 1958   F. SCHERBAUM   2,861,227
HIGH-VOLTAGE DRY RECTIFIER
Filed June 6, 1956   4 Sheets-Sheet 4

Inventor:

Friedrich Scherbaum

2,861,227

HIGH-VOLTAGE DRY RECTIFIER

Friedrich Scherbaum, Berlin-Siemensstadt, Germany, assignor to Siemens-Schuckertwerke Aktiengesellschaft, Berlin-Siemensstadt and Erlangen, Germany, a corporation of Germany Application June 6, 1956, Serial No. 589,676

25 Claims. (Cl. 317—234)

My invention relates to high-voltage dry rectifiers composed of a number of rectifier cells arranged in groups or stacks. It is known to place a large number of such stacks into respective cavities of an insulating housing.

It is an object of my invention to provide a multi-stack rectifier device which affords a favorable distribution of the electric field and facilitates maintaining sufficient spacing between live parts, in combination with minimized overall space requirements, ease of assembling and mounting the multi-stack rectifier units, and improved cooling for dissipating the waste heat.

To this end, and in accordance with my invention, the multi-cell stacks of rectifier plates or pellets are placed within a housing which is composed of one or several members of circular or substantially annular shape consisting preferably of insulating material. The housing is provided with a series of chambers located on a circle about the housing axis, and these chambers, after inserting the stacks as well as the appertaining electric interconnections or "bridges," are closed by cover plates. According to another feature, the cover plates are preferably given a ring-shaped design so that each plate closes a group of chambers or all chambers of the housing.

The chambers for receiving the stacks of rectifier cells may be given a cup-shaped design so that a single cover plate is sufficient for closing all chambers. However, the chambers may also be formed as through channels so that a cover plate is required on each side of the chamber.

According to a further feature of the invention, the cover plates, consisting preferably of the same material as the body of the housing itself, are inserted into mating seats of the housing body and are firmly joined with the body by cementing and/or by bandages consisting, for instance, of sheet metal strips, wire or cord.

A particularly space-saving design of such a high-voltage rectifier results, if according to another feature of the invention, a multiplicity of ring- or disk-shaped housing members are mounted coaxially one above the other and are electrically interconnected to form a single rectifier system. It is of advantage in such a system, to give each housing member the shape generally of a wheel having the chambers for the rectifier stacks located in the rim portion of the wheel structure and having a spoke disk perforated for good cooling and kept relatively thin in comparison with the rim portion. Such housing members are preferably electrically connected with each other at their respective hub portions. In order to permit free ingress of a cooling medium to the interior of the assembled rectifier system, the wheel-type housing members are preferably so shaped that the thickness of the rim portion in the axial direction is smaller than the axial thickness of the hub portion so that the rim portions, when the housing members are assembled, remain axially spaced from one another. The housing members can then be joined with each other simply by placing their respective hub portions onto a bolt preferably of insulating material. The electric connection between adjacent housing members, according to still another feature of the invention, is preferably effected by providing recesses at the axial front faces of the wheel structure through which recesses the connecting contact parts protrude out of the housing. These contact parts are preferably made resilient and are so designed that, when the system is assembled, each contact part enters into contact engagement with a mating contact part of the adjacent housing member. For electric and mechanical protection the two contact parts thus engaging each other may be enclosed by a protective sleeve.

According to a further feature of the invention, ring-shaped or ring-sector shaped housing members are put together to form a continuous helical structure; each member forming a full turn or part of one turn of the helix and being equipped with a multiplicity of individual stacks forming a portion of the rectifier system. The individual housing members are arranged on a common carrier and are fitted and joined with each other at least mechanically and preferably also by electrical connections. The carrier may consist of an insulating cylinder. The individual housing members, forming turns or partial turns of the complete helix, may be manufactured from the start with a helical pitch corresponding to that of the helix to be formed. However, it is also possible to produce the individual housing members at first as planar pieces whose respective ends, when assembling the housing members with adjacent ones, are bent out of the original plane so that the housing member is forced to assume a helical pitch corresponding to that of the final helix. The individual housing members are preferably first completely assembled individually by inserting the rectifier stacks as well as the appertaining electric interconnections and terminal contact parts, before placing the housing member onto the carrier. It is then only necessary to interconnect the respective housing members electrically in series in order to form the complete rectifier system. The mutual mechanical connection of the adjacent housing members when assembling the helix is simplified by forming each end of the housing member as a mating coupling which, when assembling the helix, enters into clutching or mating engagement with the end of the adjacent member preferably so that a mechanical and an electric connection are established simultaneously.

In order to have the individual turns of the helix offer a largest possible surface to gaseous or liquid cooling medium, a spacer structure may be inserted between the adjacent turns of the helix when assembling the helical structure. A single, likewise helical spacing body may be provided so that it will extend through the entire axial length of the helix. This spacing body may be firmly connected with the central carrier of the helix and may be given the stability required for directly fixing the position of the housing members to be mounted upon the carrier. This is particularly advantageous if the individual housing members are bent to helical pitch only when they are being assembled with each other to form a full helix. The spacing body, however, may also consist of a flexible or yieldable insulating material, preferably of a material of the polyamide or superpolyamide type. For a good mechanical strength of the entire assembly it is advisable to place the housing members mounted upon the common carrier mechanically under tension after the assembling is completed. Because of the high electric voltage to which the rectifier assembly is subjected, it is preferable to mount a separate portion of the mechanical tensioning device on each end of the centrally located carrier of the helix, thus eliminating the need for a through-bolt traversing the entire assembly.

Relative to all embodiments of the invention, it is generally of advantage to provide the chamber walls of the insulating housing with channels or slots parallel to the stacking direction of the rectifier stacks, and to have these channels or slots communicate with the outside of the housing in order to permit a cooling medium to enter into the interior of the chambers from the outside or from a coolant supply or circulating system.

The foregoing and other objects, advantages and features of my invention, will be apparent from the embodiments of the invention illustrated on the drawings and described in the following. On the drawings:

Fig. 6 is a part-sectional view of another complete rectifier assembly according to the invention with a composite rectifier housing of helical shape.

Figure 7:
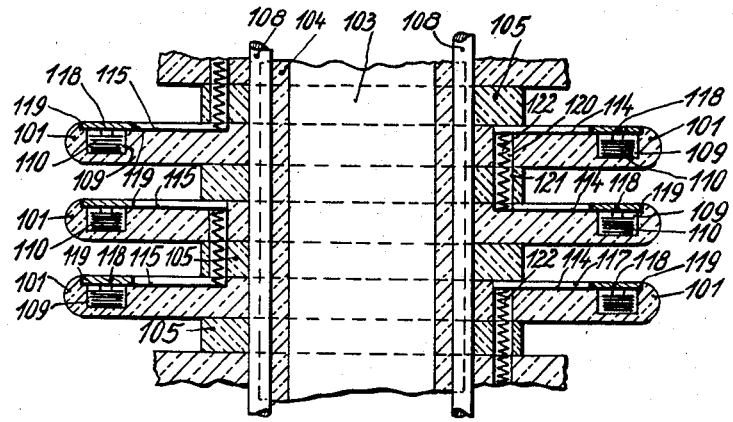
Figure 8:
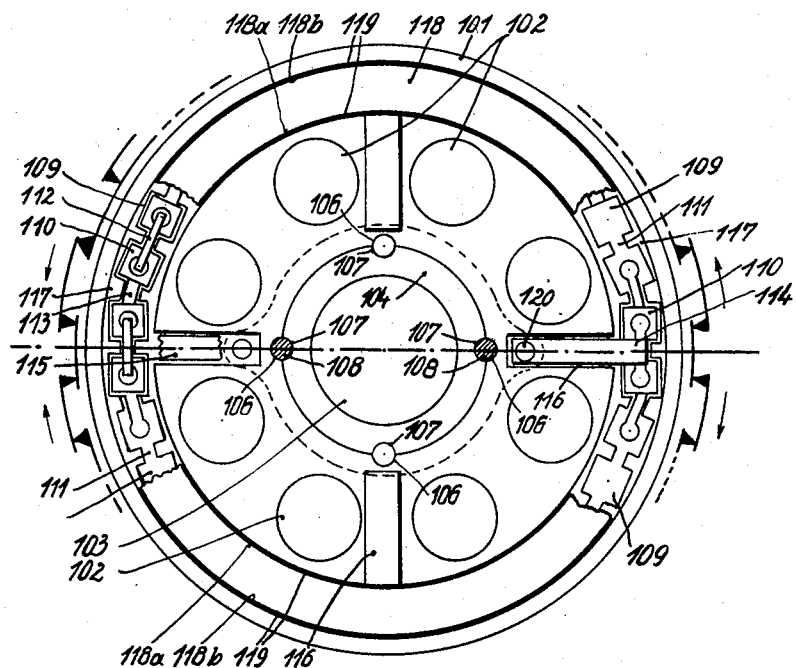

Fig. 7 shows an axial and partial view, in section, of a further high-voltage rectifier provided with housing members of ceramic material; Fig. 8 is a part sectional top view of the same embodiment; Figs. 9 and 10 show the same rectifier complete from the side and from the top respectively.

Figure 1:
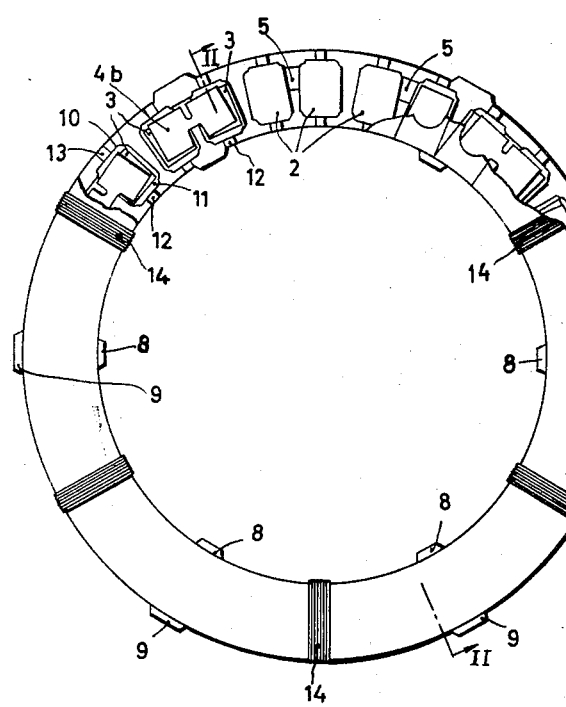
Fig. 1 shows a plan view of a high-voltage rectifier with an annular insulating body of plastic material.
Figure 2:
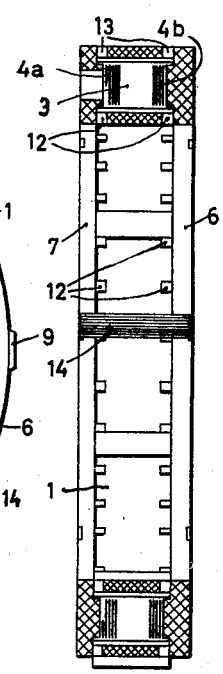
Fig. 2 is a cross-section taken along the line II—II indicated in Fig. 1.

The annular rectifier structure according to Figs. 1 and 2 is provided with an insulating housing 1 formed of a casting of resinous plastic material. The housing is provided with an annular sequence of individual chambers 2 which extend parallel to the housing axis. Located in each individual chamber is a stack 3 of rectifier cells in tablet form. Each two adjacent stacks of rectifiers are electrically interconnected by a contact bridge 4a or 4b of which one is located on the top of the stack and the other at the bottom to connect the stack with the next preceding and the next following stack respectively. At least each second one of contact bridges 4a, 4b is designed as a leaf spring. The electric current path thus extends meander-like through the entire ring system. This current path may have two terminals at its beginning and end respectively so that all rectifier stacks are serially traversed by current. However, the current path may also form two or more branches whose respective circuit connections are located diametrically opposite each other on the ring system. To permit inserting the connecting contact bridges, 4a, 4b, the radial walls of the housing that separate the chambers 2 from each other are provided with corresponding recesses 5. When the chambers 2 are open at both axial sides so as to extend all the way through the insulating housing, then the depth of the recesses 5 need only be slight. However, when the chambers are cup-shaped that is when they have an opening at only one side of the housing, then the recess 5 in each second partitioning wall must extend over the entire depth of that partition. The chambers 2 are closed on both sides by ring-shaped cover plates 6 and 7 which are so fitted onto the body of the housing 1 that the position of the cover plates is fixed by their engagement with the housing. In the illustrated embodiment the cover plates 6 and 7 are fastened to the housing by means of cord bandages 14.

As is apparent from Fig. 1, the stacks of rectifier tablets 3 do not fully occupy the space in the chambers 2. As a result there remain spaces 10 and 11 which communicate with the outside through openings 12 and 13 in the inner and outer cylindric portion of the insulating body 1. During operation of the rectifier, a cooling medium, for instance the ambient air, can circulate through the spaces 10 and 11.

The housing 1 is provided with bosses 8 and 9 by means of which they can be mounted on a central supporting rod or bolt or within a surrounding enclosure.

Any desired number of the ring-shaped rectifier units according to Figs. 1 and 2 can be placed upon a single carrier and may be cooled by a flow of air caused either by convection or by forced ventilation as obtained, for instance, with the aid of a blower. Any desired number of the ring systems may also be located within a common casing and may be cooled by liquid coolant preferably kept in circulation by means of a pump and passed through a heat exchanger or cooler outside of the rectifier casing.

Figure 3:
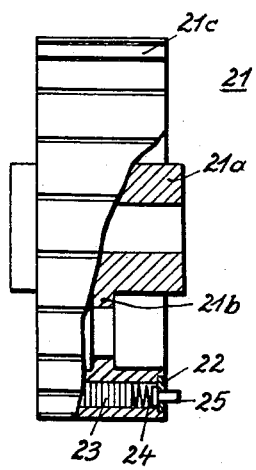
Fig. 3 shows a part-sectional side view and Fig. 4 a front view of another high-voltage rectifier equipped with a wheel-shaped insulating housing.
Figure 4:
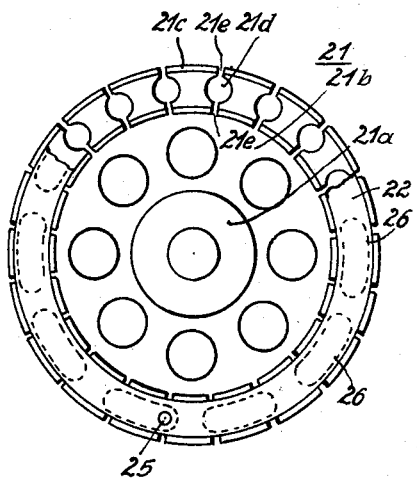

In the embodiment of Figs. 3 and 4 the insulating housing 21 for rectifier stacks has the shape of a wheel, composed of a hub 21a, a spoke-disc 21b, and a rim portion 21c. The spoke-disc 21b has an annular arrangement of holes which may be traversed by a cooling medium when the rectifier unit is in operation. As seen particularly in Fig. 3, the axial width of the spoke disc is much smaller than that of the rim portion 21c so that the major portion of the radially inner wall of rim portion 21c can also be contacted by cooling medium. The rim portion 21 has cylindrical chambers or channels 21d which communicate through slots 21e at the outer and inner cylindrical wall of the rim portion with the environment of the housing. Inserted into each chamber 21d is a rectifier stack 23 and a helical pressure spring 24. Some of the chambers also house a mushroom-shaped contact member 25. The chambers are closed by cover plates 22 which keep the parts in the chambers in the proper positions and in mutual electric contact under pressure of spring 24. Each two adjacent stacks of rectifier tablets are interconnected by contact bridges to form a continuous circuit in the manner described above with reference to Figs. 1 and 2. Such contact bridges are indicated in Fig. 4 by broken lines and denoted by 26. The cover plates 22, after being fitted into the housing, can be fastened by means of an adhesive or castable plastic, or by thermal deformation of the insulating housing 21 and/or of the cover plates 22. The contact bridges 26 which form an electric current conductor between neighboring rectifier stacks are placed alternately on top and bottom of the stacks so that the particular desired circuit connection is formed, for instance a series connection or also a simultaneous parallel connection of groups of stacks.

The above-mentioned mushroom-shaped contact member 25 is disposed only in those housing chambers that receive a rectifier stack which forms a terminal of the current path. The pin of the mushroom member protruding out of the bore in the cover plate 22 then forms a yelding electric contact for connecting the rectifier unit with an adjacent unit as is apparent from the embodiment illustrated in Fig. 5.

Figure 5:
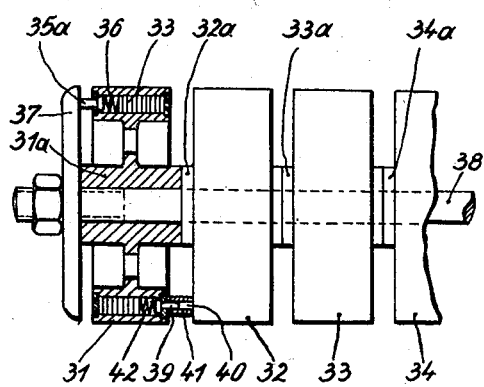
Fig. 5 is a part-sectional side view of a rectifier assembly provided with individual rectifier units substantially in accordance with Figs. 3 and 4.

According to Fig. 5 a number of wheel-shaped rectifier units 31 to 34 are placed in series upon a common screw bolt 38 of insulating material by means of which the respective hub portions 31a to 34a are kept under compressive tension against each other. The terminal members of the assembly are formed by metal discs 37 of which in Fig. 5 only the disc at the left-hand end of the assembly is illustrated. The pin of the contact member 35a (corresponding to member 25 in Figs. 3, 4) is forced by a spring 36 (corresponding to spring 24 in Fig. 3) against the disc 37. The spring 36 bears against the stack of rectifier tablets 33 so as to form an electric connection between disc 37 and stack 33. At the opposite side of the wheel-shaped rectifier unit 31 is a second contact member 39 subjected to the pressure of a spring 42. The pin of contact member 39 is in contact engagement with a counter contact 40 which form parts of the second rectifier unit 32. The pins of both contacts 39 and 40 are surrounded by a sleeve 41 of metal or insulating material which secures the two contact pins in the proper position relative to each other.

Figure 6A:
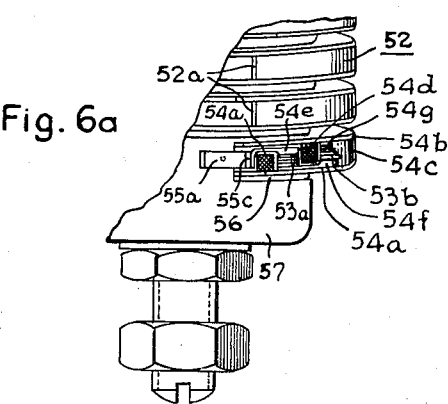
Fig. 6a shows, on larger scale, the lower terminal portion of the same rectifier, part of the lowermost housing member being removed.

In the embodiment illustrated in Figs. 6 and 6a the individual housing units are essentially ring-shaped but are so formed that they constitute together a continuous helix 52. The individual ring-shaped housing units of which the helical assembly 52 is composed are provided with a circular arrangement of chambers into which the individual rectifier stacks are inserted and are electrically interconnected by means of contact bridges substantially as described with reference to the embodiment of Figs. 1 and 2. The housing units are mounted on a carrier 51 of hollow cylindrical shape.

Preferably, the individual ring-shaped housing units are first produced as planar ring structures and are then cut open at one place. Before mounting the individual housing unit onto the carrier 51, the rectifier stacks 53 and the contact bridges for interconnecting the stacks are inserted into the housing chambers. When placing the individually assembled rectifier housing onto the hollow cylindrical carrier 51, the ends of each ring structure are bent axially away from each other, and each end is placed into engagement with the end of the adjacent ring structure. For this purpose the ends of the individual ring-shaped housing structures are given an interlinking, overlapping design. For instance, as shown, the bottom portion 54a at one end of each individual ring structure is somewhat shorter than the outer cylindrical portion 54c, whereas the top portion 54b at the same end is longer than the portion 54c. The other end of each individual ring unit is shaped in mating relation to the end-design just described. Such a ring unit may be built up from identical parts 54a and 54b. The successive ring structures are simply stuck together to form the continuous helix 52. The electric terminal contacts of the adjacent ring units are then directly in contact with each other so that simply by assembling the units an electric connection between the individual units is also secured. The terminal contact of the last ring unit is in engagement with a stationary terminal 55a or 55b which are firmly mounted on respective terminal caps 57 and 58.

In Fig. 6a the end of the housing unit that forms the lowermost turn of the helix is shown cut open between the parts 54a and 54b of the cylindrical housing wall 54c so that two chamber-separating partitions 54d appear in section. Visible also are two rectifier stacks 53a and 53b with electric contact bridges 54e, 54f and 54g.

The stationary terminal piece 55a is connected with the metal cap 57, for instance by point welding. Piece 55a has approximately the form of a right angle. One limb 55c of the angle is directed perpendicularly to the plane of illustration toward the observer. The end of the last bridge contact 54e is rectangularly bent and abuts resiliently against the limb 55c.

At the points of abutment 52a between each two adjacent rings, the electric connections are made by the two respective contact bridges which have the shape of part 54e and which bear against each other.

Wound between the turns of the helix 52 is a spacer body 56 (Fig. 6) preferably of insulating material.

In order to avoid a through bolt for attaching the terminal caps 57 and 58, such a bolt being undesired from the viewpoint of good insulation, each cap 57, 58 is individually fastened to the hollow cylindrical carrier 51. For this purpose a disc-shaped body 59 is provided in the hollow of carrier 51. A peripheral groove 60 of carrier 51 receives a ring-shaped clamping spring 61 which, when the body 59 and ring 61 are being inserted, snaps into the groove 62 when the parts 59 and 61 reach the proper position. Thereafter the cap 57 or 58 is mounted on a bolt 63 firmly secured to body 59. By tightening the fastening nut 64, the components of the helix 52 are pressed together in the axial direction. For this purpose each cap 57, 58 is so designed that the shape of its rim follows the helical pitch and at one point of the periphery has an axial step which forms an abutment for the adjacent end of the helix. In this position the end contact of the last component of the helix bears against the stationary contact 55a or 55b which, as mentioned, is fastened to the cap 57 or 58. To prevent the bolt 63 from turning when tightening the nut 64, the end of bolt 63 is provided with a slit 63a for insertion of a screw driver.

In rectifier systems according to the invention and as described above, the housing or the housing members may be produced by molding or casting a resinous plastic. This permits a simple and rapid production and permits giving the housing body great insulating strength and great mechanical stability while requiring a relatively small wall thickness. Small wall thickness promotes the dissipation of waste heat occurring during operation in the rectifier stacks. The plastic material, of course, must have sufficient temperature stability as particularly exhibited by castable resins of the ethoxyline type such as those available under the trade-name Araldit which are temperature resistant up to about 120° C. The use of resinous plastic for the housing body has the further advantage that the cover plates of the housing may be made of the same material and may be mechanically joined with the housing body by fusion or welding.

Ceramic materials are likewise applicable for the rectifier housing members. A ceramic housing for the purpose of the invention, however, must be given a relatively large wall thickness but this is compensated by the fact that ceramic materials have a better heat conductance than resinous plastics. In some cases the larger mass of the ceramic housing, particularly when the rectifier system is subjected to surge-type operation, offers the additional advantage that it is capable of temporarily receiving larger quantities of heat without excessive increase in temperature. Ceramic materials, compared with resinous plastics, have a considerably smaller dielectric constant and a smaller loss angle. These housings therefore permit the production of low-capacitance rectifier systems particularly for use at high frequencies. These advantages apply particularly when a magnesium silicate is used as the housing material, particularly the material known under the trade-name Steatite. The ceramic housing members are preferably given the shape of flat annular disks, the chambers for receiving the stacks of rectifier cells being arranged near the periphery.

When coaxially assembling a number of ceramic annular housings according to the invention, it is preferable for reasons of good cooling, to separate each two successive annular housings by a spacer ring preferably also of ceramic material, the outer diameter of the spacer ring being considerably smaller than that of the housing members. With such a dimensioning of the spacer rings, the major portion of the housing surface is freely accessible to a cooling medium, for instance ambient air or forced-flow coolant. The spacer rings may be traversed by passages for electric connections between the individual housing members. The electric connecting leads within these passages of the spacer rings are preferably designed as springs. When mounting the annular housing members upon a common central carrier, the ends of the carrier are preferably provided with corona rings to serve as electric terminals. If, and as far as, the central carrier is hollow, the hollow space may also serve to house additional parts of the electric installation of which the rectifier assembly forms part. The central carrier and the individual housing members seated thereon are preferably locked against each other with the aid of projections and recesses so that the individual housing bodies can be mounted on the carrier in different but well defined angular positions while being prevented from rotating from that position relative to the carrier.

The above-mentioned features and modifications are embodied in the rectifier device illustrated in Figs. 7 to 10 and described presently.

The device of Figs. 7 to 10 comprises a large number of individual rectifier housing members all designed as flat annular disks of ceramic material. The main body of each housing member is denoted by 101. For increasing the surface of this ceramic body and to form passages for cooling air, the body is provided with openings 102 (Fig. 8). Each housing member has a central opening 103 with which the member is seated upon a central carrier consisting of an insulating pipe 104. Separate spacer rings 105 of insulating material, preferable likewise of ceramic material, are provided between the individual housing disks. As is apparent from Fig. 7, the spacer rings 105 have a considerably smaller outer diameter than the main bodies 101 of the housing members so that the major portion of the surface of bodies 101 is exposed.

The wall of the central opening 103 of each housing member 101 has a number of grooves 106 spaced from each other along the periphery. These grooves permit placing the annular housings in different angular positions onto the insulating pipe 104 and they prevent the housing member from rotating relative to the pipe. For this purpose the insulating pipe has corresponding grooves 107. Locking rods 108 are inserted into the grooves 106 and 107. Consequently each individual housing member can be positioned, as desired, in any one of four different positions 90° spaced from each other.

Each individual housing body 101 is provided with cup-shaped or prismatic chambers 109 located on a circle along the outer periphery. Respective stacks 110 of rectifier cells are inserted into the chambers. The housing member has connecting channels 111 between the chambers 109. Connecting bridge members 112 and 113 are placed into the channels for electrically connecting adjacent rectifier stacks with each other. The connecting bridges 113 are located on the bottom of the cup-shaped chambers, the rectifier stacks being placed upon these bridges. The connecting bridges 112 are placed upon the uppermost cell or tablet of each stack. The connecting bridges 112 and 113 are preferably designed as springs. Connecting rails 114 and 115 are inserted in respective channels of the housing member at those places where an electric connection of the stack system is to protrude out of the housing member. The connecting rails 114 and 115 extend toward the middle of the housing member.

Each housing member 101 has a concentric annular, flat-bottomed grove on its upper surface (Fig. 7); and the openings of the cup-shaped chambers 109 are located in the plane of the groove bottom. The groove thus forms a frame for the insertion of a cover ring 118. By inserting the cover ring 118, the rectifier stacks with their interconnecting bridges and terminal rails are directly placed under compressive tension so that a good electric contact as well as a reliable positioning of the stacks is obtained.

The inserted cover ring 118 is fastened at its rims 118a and 118b by a cemented junction 119 to the housing body so that a good sealing of the chambers 109 is also secured.

The free end of each connecting rail 114, 115 is located above a through channel 120 of the disk-shaped housing member 101. After assembling the various housing members to the arrangement according to Fig. 7, the channel 120 is aligned with a corresponding channel 121 in an adjacent spacer ring. A spring 122 serving as an electric conductor is inserted into these channels between the terminals of two axially sequential housing members that are to be interconnected electrically.

As shown in Figs. 9 and 10 the ends of the multi-housing rectifier device are provided with corona rings 123 and 124 which are electrically connected with the ends of the rectifier column. The tubular carrier 104 may have one or both ends equipped with fastening means depending upon the particular manner in which it is to be mounted or supported in an electric distribution system.

The individual rectifier housing member 101, depending upon the particular use or the high-voltage condition to be satisfied, may have any suitable interconnection of its various rectifier stacks, and the cup-shaped chambers along the periphery may be completely or only in part filled with such stacks. For some applications each individual housing member may be provided with an electric rectifier circuit which is closed upon itself, for instance, by connecting the rectifier stacks in a loop formed of two parallel branches. In this case the connecting rails 114 and 115 protruding from the housing member, as apparent from Fig. 8, form the ends of the loop circuit.

As mentioned, the hollow space within the carrier 104 may be utilized for accommodating other electric parts of the installation such as capacitors.

It will be obvious to those skilled in the art upon a study of this disclosure that my invention permits of various modifications relative to the individual multi-stack rectifier units as well as relative to their assembly and hence may be embodied in devices other than those particularly illustrated and described, without departing from the essential features of my invention and within the scope of the claims annexed hereto.

I claim:

1. A dry rectifier device, particularly for high voltage, comprising an insulating housing member of substantially annular shape having a free inner space and having a multiplicity of chambers arranged in a circular series about said inner space and in concentric relation to the housing axis, stacks of rectifier cells in said respective chambers, contact bridges electrically interconnecting each two adjacent ones of said stacks within said housing member, and cover plates fitted into said housing member and closing said chambers, said cover plates being mechanically joined with said housing member, said inner space of said housing communicating with the outside of the device.

2. A dry rectifier device, particularly for high voltage, comprising a plurality of housing members of circular shape each having a multiplicity of chambers arranged in a series about the axis of the member, stacks of rectifier cells in said respective chambers, contact means electrically interconnecting said stacks, said plurality of housing members being mounted in coaxial relation to each other and being electrically interconnected to form together a single rectifier system.

3. A dry rectifier device, particularly for high voltage, comprising a wheel-shaped insulating housing member having a peripheral rim portion and disc portion of small axial thickness as compared with said rim portion, a multiplicity of chambers arranged in a circular series within said rim portion, stacks of rectifier cells in said respective chambers, contact bridges electrically interconnecting said stacks within said housing member, and closure means covering said chambers.

4. In a rectifier device according to claim 2, each of said plurality of housing members consisting of a wheel-shaped structure and having a hub portion, a rim portion and an intermediate disc portion of smaller axial width than said hub and rim portions, said chambers being located in said rim portion, and said respective housing members being joined together at their hub portions.

5. In a rectifier device according to claim 2, each of said plurality of housing members consisting of a wheel-shaped structure and having a hub portion, a rim portion and an intermediate disc portion, said hub portion having larger axial width than said rim portion, said disc portion being axially thin in comparison with said rim portion, said chambers being located in said rim portion, and said respective housing members being joined together at their respective hub portions.

6. In a rectifier device according to claim 2, each of said housing members consisting of a wheel-shaped structure and having a hub portion, a rim portion and an intermediate disc portion of smaller axial width than said hub and rim portions, said chambers being located in said rim portion, and a bolt upon which said hub portions of said respective housing members are seated axially adjacent to each other.

7. In a rectifier device according to claim 2, each of said plurality of housing members having openings in its axial sides respectively, and electric contact means projecting out of said openings and forming an electrical connection between respective rectifier stacks of mutually adjacent ones of said housing members.

8. In a rectifier device according to claim 2, each of said housing members consisting of a wheel-shaped structure and having a hub portion, a rim portion and an intermediate disc portion of smaller axial width than said hub and rim portions, said chambers being located in said rim portion, electric contact means protruding from said rim portion in a direction parallel to the wheel axis and being yieldable toward said rim portion, said contact means of each housing member being in pressure engagement with said contact means of the adjacent housing member in the assembled condition of said rectifier system and forming an electric circuit connection between the rectifier stacks of said respective housing members.

9. A rectifier device according to claim 8, comprising a sleeve enclosing said mutually engaging contact means between said two adjacent housing members, said sleeve being seated upon the protruding portions respectively of said two contact means.

10. A dry rectifier device, comprising a plurality of insulating housing members having individually the shape of a slitted ring and being coaxially mounted together in end-to-end relation to form a single continuous helical assembly in which each housing member constitutes one helical turn, each of said housing members having a multiplicity of chambers arranged in a series about the axis of the member, stacks of rectifier cells in said respective chambers, contact bridges electrically interconnecting said stacks within said housing member and a carrier structure centrally located within said helical assembly, said housing members being mounted on said carrier structure.

11. In a rectifier device according to claim 10, said housing members having mechanically interlocking ends each in mating engagement with the end of an adjacent housing member, and each housing member having electric contact means located at said respective ends and in electric contact engagement with the corresponding contact means of the adjacent housing member, whereby said rectifier stacks in said respective housing members are electrically interconnected by said contact means.

12. In a rectifier according to claim 10, each of said housing members when disassembled having individually a helical pitch corresponding to that of the helical assembly.

13. In a rectifier according to claim 10, each of said housing members when disassembled having individually a planar shape and being deformed to helical shape in assembled condition of said helical assembly.

14. A rectifier device according to claim 10, comprising spacer means interposed between adjacent turns of said helical assembly.

15. A rectifier device according to claim 10, comprising a continuous helical spacer body extending between the turns of said helical assembly over the entire axial length thereof.

16. A rectifier device according to claim 10, comprising a continuous helical spacer body of flexible insulating material extending between the turns of said helical assembly over the entire axial length thereof.

17. A rectifier device according to claim 10, comprising tensioning means mounted on said carrier and engaging said helical assembly under axially compressive force for mechanically tensioning the components of said assembly.

18. A rectifier device according to claim 10, comprising two mutually spaced tensioning means individually mounted on said carrier at the respective axial ends thereof, each of said tensioning means being in pressure engagement with the adjacent end of said helical assembly for mechanically compressing the components of said assembly between said two tensioning means.

19. In a rectifier device according to claim 1, said chambers having slots in their respective walls, said slots forming a communication of said respective chambers with the outside of said housing member and with said inner space of said housing member for the passage of cooling medium through the chamber.

20. In a rectifier device according to claim 2, said housing members consisting of ceramic material and having each the shape of a flat annular disc, a central carrier on which said disc-shaped housing members are seated, and a spacer ring of ceramic material disposed between each two adjacent ones of said members, said spacer rings having small outer diameter compared with that of said members so that most of the surface of said members remain exposed.

21. In a rectifier device according to claim 20, said spacer rings having passages parallel to the carrier axis, and electric conductor means extending through said passages and electrically interconnecting said rectifier stacks in said respective housing members.

22. In a rectifier device according to claim 20, said spacer rings having passages parallel to the carrier axis, and helical springs disposed in said respective passages and electrically interconnecting said rectifier stacks in said respective housing members.

23. A rectifier device according to claim 2, comprising a carrier centrally located and surrounded by said housing members, said members being all mounted on said carrier, said carrier having electric terminal structures on its axial ends respectively, and corona rings forming part of said respective terminal structures.

24. A rectifier device according to claim 2, comprising a tubular carrier of insulating material surrounded by said housing members and having a hollow space for accommodation of rectifier circuit components, said members being mounted on said tubular carrier, said carrier having electric terminal structures on its axial ends respectively.

25. A rectifier device according to claim 2, comprising a carrier centrally located and surrounded by said housing members, said members being all mounted on said carrier, said carrier and each of said members having mutually engageable stop means preventing rotation of said members relative to said carrier, and said respective stop means having a given number of selective positions of engagement spaced angularly from each other.

References Cited in the file of this patent

UNITED STATES PATENTS

| 2,423,091 | Flore et al. | July 1, 1947 |
| 2,550,710 | Morris | May 1, 1951 |
| 2,634,379 | Brainard | Apr. 7, 1953 |

FOREIGN PATENTS

| 305,514 | Germany | Oct. 6, 1919 |
| 587,201 | Great Britain | Apr. 17, 1947 |
| 694,755 | Great Britain | July 29, 1953 |